(12) United States Patent
Morrison et al.

(10) Patent No.: US 10,638,783 B2
(45) Date of Patent: May 5, 2020

(54) GELLAN GUM PRODUCTS AND METHODS OF MANUFACTURE AND USE THEREOF

(71) Applicant: CP Kelco U.S., Inc., Atlanta, GA (US)

(72) Inventors: Neil A. Morrison, San Diego, CA (US); Todd A. Talashek, San Diego, CA (US); Hailong Yu, San Diego, CA (US); Robert Raczkowski, Chula Vista, CA (US)

(73) Assignee: CP KELCO U.S., INC., Atlanta, GA (US)

(*) Notice: Subject to any disclaimer, the term of this patent is extended or adjusted under 35 U.S.C. 154(b) by 31 days.

(21) Appl. No.: 14/684,881

(22) Filed: Apr. 13, 2015

(65) Prior Publication Data

US 2016/0295887 A1    Oct. 13, 2016

(51) Int. Cl.
*A23L 29/00* (2016.01)
*A23L 29/269* (2016.01)

(52) U.S. Cl.
CPC ......... *A23L 29/272* (2016.08); *A23V 2002/00* (2013.01)

(58) Field of Classification Search
CPC ............................ A23L 1/0545; A23L 29/272
USPC ......................................................... 426/48
See application file for complete search history.

(56) References Cited

U.S. PATENT DOCUMENTS

| | | | |
|---|---|---|---|
| 4,869,916 A | 9/1989 | Clark et al. | |
| 5,112,445 A | 5/1992 | Winston, Jr. et al. | |
| 5,498,436 A * | 3/1996 | Modliszewski | A23C 19/0765 426/573 |
| 5,534,286 A | 7/1996 | Chalupa et al. | |
| 7,494,667 B2 | 2/2009 | Chantranukul et al. | |
| 8,053,216 B2 | 11/2011 | Yang et al. | |
| 8,231,921 B2 * | 7/2012 | Bezanson | A23G 3/42 426/576 |
| 2002/0081361 A1 | 6/2002 | Towb et al. | |
| 2004/0121051 A1 | 6/2004 | Fenn et al. | |
| 2008/0145505 A1 | 6/2008 | Bezanson et al. | |

FOREIGN PATENT DOCUMENTS

| | | | | |
|---|---|---|---|---|
| CN | 102391384 A | | 3/2012 | |
| EP | 0291228 A1 | | 11/1988 | |
| EP | 0342738 | * | 11/1989 | ............... A23L 1/04 |
| JP | 2012167273 | * | 6/2012 | ............... A23L 1/04 |
| WO | 02/14374 A2 | | 2/2002 | |
| WO | 2002014374 A2 | | 2/2002 | |
| WO | 2008/134306 A1 | | 11/2008 | |
| WO | 2014104318 A1 | | 7/2014 | |

OTHER PUBLICATIONS

JP-2012-167273—Machine Translation.*
Bajaj, I. B. et al. 2007. Food Technol. Biotechnol. 45: 341-354.*
Bajaj, I. B. et al. 2007. Food Technol. Biotechnol. 45: 341-354 (Year: 2007).*
International Search Report and Written Opinion for International Application No. PCT/US2016/024140, dated Jun. 21, 2016 (11 pages).

* cited by examiner

*Primary Examiner* — Hamid R Badr
(74) *Attorney, Agent, or Firm* — Eversheds Sutherland (US) LLP

(57) ABSTRACT

Gellan gum products having an increased bulk density are provided that include a gellan gum co-precipitated with a co-precipitation agent to form a co-precipitated gellan composition. The co-precipitation agent and the gellan gum are present in the co-precipitated composition in a weight ratio effective to produce the gellan gum product, in which the gellan gum product bulk density is greater than a bulk density of the gellan gum precipitated, dried, and milled without the co-precipitation agent. This greater bulk density is about 0.30 g/mL or greater. Methods are provided for preparing a gellan gum product having an improved bulk density, in which the gellan gum product bulk density is greater than a bulk density of the gellan gum precipitated, dried, and milled without the co-precipitation agent. This greater bulk density is about 0.30 g/mL or greater.

28 Claims, No Drawings

GELLAN GUM PRODUCTS AND METHODS OF MANUFACTURE AND USE THEREOF

TECHNICAL FIELD

The present disclosure is generally in the field of gellan gum, and more particularly, gellan gum products with improved bulk density.

BACKGROUND

Gums, also called hydrocolloids, are polysaccharides. Polysaccharides are polymers of simple sugar building blocks which have been in use since about 1900. Use of gums has increased throughout the century, particularly in the past 40 years, and today they are used in a wide variety of products and processes. Certain micro-organisms are capable of producing polysaccharides with properties differing from those of gums from more traditional sources. One example of such microbially-produced polysaccharides is gellan gum.

Gellan gum, first discovered in 1978 by Kelco, is produced by strains of the species *Sphingomonas elodea* (formerly *Pseudomonas elodea*), for example, strain ATCC 31461. Commercially, this gum is produced as an extracellular product by aqueous cultivation of the micro-organisms in a medium containing appropriate carbon sources, phosphate sources, organic and inorganic nitrogen sources, and suitable trace elements. The fermentation is carried out under sterile conditions with strict control of aeration, agitation, temperature and pH. When fermentation is complete, the produced viscous broth is pasteurized to kill viable cells prior to recovery of the gum. The gum can be recovered in several ways. Direct recovery from the broth yields the gum in its native or high acyl (HA) form. Recovery after deacylation by treatment with a base yields the gum in its low acyl (LA) form. Acyl groups present in the gum are found to influence its characteristics significantly.

In the native or high acyl (HA) form two acyl substituents, acetate and glycerate, are present. Both substituents are located on the same glucose residue and, on average, there is one glycerate per repeat unit and one acetate per every two repeat units. In the low acyl (LA) form, the acyl groups have been removed to produce a linear repeat unit substantially lacking such groups.

Low acyl (LA) gellan gums form gels when cooled in the presence of gel-promoting cations, preferably divalent cations, such as calcium and magnesium. The gels formed are firm and brittle. High acyl (HA) gellan gums do not require the presence of cations for gel formation, and the gels formed have structural and rheological characteristics which are significantly affected by the acyl substituents. Thus, the properties of HA gellan gels differ significantly from those of LA gellan gels. HA gellan gels are typically soft and flexible and lack thermal hysteresis.

In conventional gellan gum products, HA gellan products have been found to have a lower bulk density than LA gellan products. In fact, enzyme-treated HA gellan products have been found to have even a lower bulk density than untreated HA gellan products. The low bulk density of HA gellan products presents potential difficulties in the manufacture and use thereof (e.g., food, industrial, consumer applications). Such difficulties can limit the application scope of HA gellan products that would otherwise be available if the bulk density was greater and also complicate downstream processing (e.g., drying, milling, and the like) of HA gellan products.

It, therefore, would be desirable to provide gellan gum products that are capable of ameliorating some or all of the foregoing disadvantages. In particular, it would be desirable to provide gellan gum products with a higher bulk density.

SUMMARY

In one aspect, methods of preparing a gellan gum product are provided including methods for increasing bulk density. In one embodiment, a method comprises co-precipitating an aqueous gellan gum solution with a co-precipitation agent that includes a biopolymer to form a co-precipitated composition. In another embodiment, the method comprises co-precipitating an aqueous gellan gum solution with a co-precipitation agent that includes a biopolymer to form a co-precipitated composition, in which the gellan gum product, after drying and milling, has a bulk density greater than a bulk density of the aqueous gellan gum solution precipitated, dried, and milled without the co-precipitation agent. In another embodiment, the method comprises co-precipitating an aqueous gellan gum solution with a co-precipitation agent that includes a biopolymer to form a co-precipitated composition, in which the gellan gum product, after drying and milling, has a bulk density of about 0.30 g/mL or greater.

In another aspect, gellan gum products are provided including gellan gum products with an increased bulk density. In one embodiment, the improved gellan gum product comprises a co-precipitated composition having a gellan gum that is co-precipitated with a co-precipitation agent that includes a biopolymer. The co-precipitation agent and the gellan gum are present in the co-precipitated composition in a weight ratio effective to produce the gellan gum product, wherein the gellan gum product, after drying and milling, has a bulk density greater than a bulk density of the gellan gum precipitated, dried, and milled without the co-precipitation agent.

DETAILED DESCRIPTION

The present invention is described in detail in connection with various embodiments for purposes of illustration only. Parameters of different steps, components, and features of the embodiments are described separately, but may be combined consistently with this description of claims, to enable other embodiments as well to be understood by those skilled in the art. Various terms used herein are likewise defined in the description which follows. Concentrations and percent are in weight percent unless the context indicates otherwise, and molecular weight is number average molecular weight unless the context indicates otherwise.

The present teachings are directed to gellan gum products and methods of manufacture and use thereof. The gellan gum products described herein include a gellan gum co-precipitated with a co-precipitation agent. The co-precipitation agent can be a biopolymer. These gellan gum products are manufactured by co-precipitation, thereby advantageously producing gellan gum products with a higher bulk density compared to conventional gellan gum products manufactured without co-precipitation or to dry blended gellan gums with a biopolymer at ratios similar to or the same as the ratios of the gellan gum products disclosed herein. See, e.g., Example 4. The increase in bulk density of the gellan gum products beneficially provides gellan gum products that are more suitable for manufacture and use in various applications. Further, gellan gum products with higher bulk densities can be supplied in increased amounts per volume of product.

In embodiments, the gellan gum may be a high-acyl (HA) gellan gum, low-acyl (LA) gellan gum, or a combination thereof. The gellan gum is co-precipitated with a co-precipitation agent to form a co-precipitated composition. In some embodiments, the co-precipitation agent is a biopolymer.

Non-limiting examples of suitable biopolymers include polysaccharides, proteins, or combinations thereof. Non-limiting examples of suitable polysaccharides include starch, dextrin, glucans, xanthan gum, diutan gum, welan gum, rhamsan gum, pectin, carrageenan, cellulose and its derivatives, guar gum, locust bean gum, chitin, chitosan, agar, alginate, gum arabic and the like. In one embodiment, the polysaccharide includes a starch. Non-limiting examples of starches include, native starches (e.g., un-modified starches of any composition of amylose and amylopectin from sources, such as corn, potato, rice, tapioca, and the like), modified starches (e.g., physically and/or chemically, and/or enzymatically modified starches), or combinations thereof. The term "modified" starches as used herein are starches that have undergone a modification process (e.g., pre-gelatinization, heat treatment, addition and/or modification of functional groups, cross-linking and/or enzymatic treatment). Non-limiting examples of dextrins include dextrins with any dextrose equivalent (DE) value, maltodextrins with any DE value, or combinations thereof.

In embodiments, the co-precipitation agent and the gellan gum are present in the co-precipitated composition in a weight ratio effective to produce a gellan gum product that, after drying and milling, has a bulk density greater than a bulk density of the gellan gum precipitated, dried, and milled without the co-precipitation agent. In some embodiments, the weight ratio of co-precipitation agent to gellan gum is about 1:100 to about 10:1 by weight of the co-precipitated composition. In another embodiment, the weight ratio of co-precipitation agent to gellan gum is about 1:100 to about 1:1 by weight of the co-precipitated composition. In yet another embodiment, the weight ratio of co-precipitation agent to gellan gum is about 1:20 to about 1:2 by weight of the co-precipitated composition. In other embodiments, the weight ratio of co-precipitation agent to gellan gum is 1:2 by weight of the co-precipitated composition, 1:4 by weight of the co-precipitated composition, 1:8 by weight of the co-precipitated composition, or 1:16 by weight of co-precipitation composition.

As used herein, the "bulk density" of a material is the ratio of the mass of the material to the total volume occupied (including air) of the material. For determining bulk density, the following bulk density method was performed. A gellan gum product sample of a predetermined weight is introduced into a graduated cylinder, without compacting. The graduated cylinder, with the sample contained therein, is then tapped on a hard surface, e.g., a table, until the volume of the sample remains constant, e.g., tapped for about 100 times. After compacting the sample, the volume level of the compacted sample in the cylinder is observed. The bulk density of the sample is then calculated using the following equation:

$$\text{Bulk Density}\left(\frac{g}{mL}\right) = \frac{W_s}{V_s}$$

wherein: $W_s$=weight of sample (g)
$V_s$=observed volume level (mL)

In some embodiments, the bulk density of the gellan gum precipitated, dried, and milled without the co-precipitation agent is about 0.55 g/mL or less. In one embodiment, the bulk density of the gellan gum precipitated without a co-precipitation agent is about 0.30 g/mL to about 0.45 g/mL. In another embodiment, the bulk density of the gellan gum precipitated without a co-precipitation agent is about 0.40 g/mL.

In some embodiments, the gellan gum product bulk density is about 0.30 g/mL or greater. In one embodiment, the gellan gum product bulk density is about 0.30 g/mL to about 1.00 g/mL. In another embodiment, the gellan gum product bulk density is about 0.40 g/mL to about 0.85 g/mL. In yet another embodiment, the gellan gum product bulk density is about 0.66 g/mL. In other embodiments, the gellan gum product bulk density is greater than 0.30, or greater than about 0.35, or greater than about 0.40, or greater than about 0.45, or greater than about 0.50, or greater than about 0.55, or greater than about 0.60, or greater than about 0.65, or greater than about 0.70, or greater than about 0.75, or greater than about 0.80, or greater than about 0.85, or greater than about 0.90, or greater than about 0.95.

It should be noted that even though the bulk densities for gellan gum precipitated, dried, and milled without the co-precipitation agent and the gellan gum product bulk densities as disclosed above may overlap, in operation, the addition of co-precipitation agent by co-precipitation to aqueous gellan gum solution at any ratio results in an increase of the bulk density over what the same gellan gum would have been without co-precipitation with the co-precipitation agent. That is, as illustrated in Examples 4 and 5, at any addition of co-precipitation agent to aqueous gellan gum solution, the co-precipitation agents increase the gellan gum product bulk density to varying degrees when compared to the aqueous gellan gum solution precipitated, dried, and milled without the co-precipitation agent.

Without being limited to a single theory, high molecular weight (MW) gellan gum tends to have lower bulk density than lower MW gellan gum. Generally, high MW gellan gum is produced from fermentation, but the bulk density tends to be in poor control and is usually too low to go through the additional manufacturing processes of drying and milling without plug ups and to pass the product bulk density specification without complication.

Embodiments of the gellan gum products described herein are manufactured via co-precipitation. Manufacturing by co-precipitation has been found to produce gellan gum products with higher bulk densities for ease of downstream processing. Without being bound to a single theory, co-precipitating gellan gum with a co-precipitation agent increases the bulk density without having to decrease molecular weight, thereby resulting in high MW gellan gums that are amenable to manufacturing processes with higher process throughputs (e.g., faster milling and decreased plug ups) and increased use.

Methods of Fabrication

The gellan gum products described herein are made by a co-precipitation process. In one embodiment, a method of preparing a gellan gum product having an improved bulk density includes co-precipitating an aqueous gellan gum solution with a co-precipitation agent comprising a biopolymer to form a co-precipitated composition, in which the gellan gum product, after drying and milling, has a bulk density greater than a bulk density of the aqueous gellan gum solution precipitated, dried, and milled without the co-precipitation agent.

In another embodiment, a method of preparing a gellan gum product having an improved bulk density includes co-precipitating an aqueous gellan gum solution with a co-precipitation agent comprising a biopolymer to form a co-precipitated composition, in which the gellan gum product, after drying and milling, has a bulk density of about 0.30 g/mL or greater.

In embodiments, the aqueous gellan gum solution comprises gellan gum. In some embodiments, the aqueous gellan gum solution is in the form of a reconstituted gellan gum solution, other suitable gellan gum containing aqueous solutions, or combinations thereof. As used herein, "reconstituted gellan gum solution" is a dried gellan gum that is combined with a liquid, e.g., water. In other embodiment, the aqueous gellan gum solution is in the form of a fermentation broth. The term "broth" as used herein contains gellan-producing bacteria, e.g., *Sphingomonas elodea* and a fermentation medium. As used herein, "fermentation medium" is a medium that may comprise carbon sources, organic and inorganic nitrogen sources, and suitable trace elements.

In one embodiment, the broth is fermented to produce the aqueous gellan gum solution and then a co-precipitation agent is subsequently added to the aqueous gellan gum solution. In another embodiment, a co-precipitation agent is added to the broth at the same time the broth is being fermented to produce the aqueous gellan gum solution. In yet another embodiment, the co-precipitation agent is added to the broth prior to the broth being fermented to produce the aqueous gellan gum solution.

In some embodiments, the broth is fermented to produce the aqueous gellan gum solution by the fermentation processes disclosed in U.S. Pat. No. 4,326,053, which is incorporated by reference.

Although not necessary in all embodiments, the gellan gum solution may undergo additional optional treatments that may be useful in certain embodiments. Non-limiting examples of optional treatments include any additional step that does not adversely affect the gellan gum product, such as, but not limited to, treating the gellan gum solution with surfactants, chelating agents, antioxidants, enzymes, or combinations thereof, filtration, or combinations thereof.

In some embodiments, the aqueous gellan gum solution undergoes an optional enzymatic treatment. The optional enzymatic treatment can comprise adding one or more enzymes to the aqueous gellan gum solution at the same time or, in the alternative, each of the one or more enzymes are added to the aqueous gellan gum solution separately. Non-limiting examples of suitable enzymes include lysozymes, proteases, and combinations thereof.

In some embodiments, the aqueous gellan gum solution undergoes an optional surfactant treatment. The optional surfactant treatment can comprise adding one or more surfactants to the aqueous gellan gum solution at the same time or, in the alternative, each of the one or more surfactants are added to the aqueous gellan gum solution separately. Non-limiting examples of suitable surfactants include sodium dodecyl sulfate (SDS), polysorbates, lecithins, sugar esters, monoglycerides, monoglycerides esters, and combinations thereof.

In some embodiments, the step of co-precipitating includes combining the co-precipitation agent with the aqueous gellan gum solution to form a mixture and precipitating the mixture to form the co-precipitated composition. In one embodiment, the co-precipitation agent is combined with the aqueous gellan gum solution in the form of an aqueous solution or a powder. In another embodiment, the step of precipitating the mixture includes precipitating the mixture at a temperature of about 90° C.

In some embodiments, the co-precipitating agent is added to the aqueous gellan gum solution in dry form, i.e., powder, in a weight ratio of 1:100,000 to 10:1 (dry agent to aqueous gellan gum solution). In one embodiment, the co-precipitating agent is added to the aqueous gellan gum solution in a dry form in a weight ratio of 1:10,000 to 1:1 (dry agent to aqueous gellan gum solution). In other embodiments, the co-precipitating agent is added to the aqueous gellan gum solution in wet form, i.e., an aqueous suspension of co-precipitating agent powder and any liquid or liquids such as water, organic solvents, or combinations thereof, in a weight ratio of 1:100,000 to 1000:1 (wet agent to aqueous gellan gum solution). In another embodiment, the co-precipitating agent is added to the aqueous gellan gum solution in a wet form in a weight ratio of 1:10,000 to 10:1 (wet agent to aqueous gellan gum solution).

Although not necessary in all embodiments, the mixture of the aqueous gellan gum solution and the co-precipitation agent may undergo additional optional treatments that may be useful in certain embodiments. Non-limiting examples of optional treatments include any additional step that does not adversely affect the gellan gum product, such as, but not limited to, treating the mixture with surfactants, chelating agents, antioxidants, enzymes, or combinations thereof, filtration, or combinations thereof.

In some embodiments, the mixture of the co-precipitation agent and the aqueous gellan gum solution undergoes an optional enzymatic treatment. In such embodiments, one or more enzymes are added to the mixture at the same time or, in the alternative, each of the one or more enzymes are added to the mixture separately. Non-limiting examples of suitable enzymes include lysozymes, proteases, and combinations thereof.

In some embodiments, the mixture of the co-precipitation agent and the aqueous gellan gum solution undergoes an optional surfactant treatment. In such embodiments, one or more surfactants are added to the mixture at the same time or, in the alternative, each of the one or more surfactants are added to the mixture separately. Non-limiting examples of suitable surfactants include sodium dodecyl sulfate (SDS), polysorbates, lecithins, sugar esters, monoglycerides, monoglycerides esters, and combinations thereof.

In some embodiments, the step of co-precipitating also comprises pasteurizing the mixture of the co-precipitation agent and gellan gum solution. In such embodiments, the step of pasteurizing occurs prior to the step of precipitating the mixture.

Without being bound by a single theory, it is believed that in embodiments that include the step of pasteurizing prior to the step of precipitating the mixture, the pasteurization temperatures enhances the precipitation of the mixture, which in these embodiments occurs at the pasteurization temperature, and also changes the conformation of the co-precipitation agent (e.g., gelatinization of the co-precipitation agent). This change in conformation may be advantageous for the interaction between the co-precipitation agent and the molecules of the gellan gum. In one embodiment, the mixture is pasteurized at a temperature from about 80° C. to about 125° C. In another embodiment, the mixture is pasteurized at a temperature from about 90° C. to about 110° C. In yet another embodiment, the mixture is pasteurized at a temperature from about 90° C. to about 100° C.

In some embodiments, the step of precipitating the mixture of the co-precipitation agent with the aqueous gellan gum solution comprises adding an effective amount of an anti-solvent to the mixture to precipitate the co-precipitated composition from the mixture. In one embodiment, the anti-solvent is an alcohol-water mixture that comprises an alcohol in an amount of about 80% to about 99% based on volume of the alcohol-water mixture. In another embodiment, the anti-solvent is an alcohol-water mixture that comprises an alcohol in an amount of about 80% to about 90% based on volume of the alcohol-water mixture. In yet another embodiment, the anti-solvent is an alcohol-water mixture that comprises an alcohol in an amount of about 80% to about 85% based on volume of the mixture alcohol-water mixture. In another embodiment, the anti-solvent is an alcohol-water mixture that comprises an alcohol in an amount of about 83% to about 85% based on volume of the alcohol-water mixture. In other embodiments, the anti-solvent only comprises one or more alcohols. Non-limiting examples of suitable alcohols include isopropanol (IPA), ethanol, or combinations thereof. Although not necessary in all embodiments, modifying other condition parameters for co-precipitating the mixture, such as pressure, pH, etc., may be useful in other embodiments.

In embodiments where an anti-solvent is added to the mixture of the co-precipitation agent with the aqueous gellan gum solution during the co-precipitation step, the gellan gum product may comprise alcohol in an amount of about 1,000 ppm or less. For example, in one embodiment, the gellan gum product comprises alcohol in an amount of about 800 ppm or less. In another embodiment, the gellan gum product comprises alcohol in an amount of about 750 ppm or less. In yet another embodiment, the gellan gum product comprises alcohol in amount of about 1 ppm to about 750 ppm.

In some embodiments, the method also includes de-liquefying the co-precipitated composition. Non-limiting examples of the step of de-liquefying the co-precipitated composition includes pressing the co-precipitated composition, centrifuging the co-precipitated composition, or combinations thereof. Non-limiting examples of the step of pressing the co-precipitated composition include hydraulic pressing, screw pressing, or a combination thereof. In one embodiment, the co-precipitated composition is screw pressed at 40 psi for about 30 minutes.

In some embodiments, the method also includes drying the co-precipitated composition. Non-limiting examples of drying the co-precipitated composition include convection drying, humidity drying, drum drying, vacuum drying, spray drying, fluid bed drying, or any other drying methods that do not adversely affect the properties of gellan gum product, or combinations thereof. In one embodiment, the step of drying the co-precipitated composition includes convection drying the composition at about 65° C. for about 4 hours. In another embodiment, the step of drying the co-precipitated composition includes convection drying the co-precipitated composition at about 40° C. for about 18 hours. In yet another embodiment, the step of drying the co-precipitated composition includes humidity drying at about 60° C. at about 40.0% relative humidity for about 2.5 hours and then at about 60° C. without humidity for about 1 hour.

In embodiments, the gellan gum product comprises water in an amount of about 20% or less by weight of the gellan gum product. For example, in one embodiment, the gellan gum product comprises water in an amount of less than about 18% by weight of the gellan gum product. In another embodiment, the gellan gum product comprises water in an amount of less than about 15% by weight of the gellan gum product. In yet another embodiment, the gellan gum product comprises water in amount of less than about 10% by weight of the dried gellan gum product. In a further embodiment, the gellan gum product comprises water in amount of less than about 5% by weight of the gellan gum product. In another embodiment, the gellan gum product comprises water in an amount of about 0.01% to about 20% by weight of the gellan gum product. In yet another embodiment, the gellan gum product comprises water in an amount from about 0.01% to about 10% by weight of the gellan gum product. In other embodiments, the gellan gum product comprises water in an amount of about 0% to about 20% by weight of the gellan gum product or 0% to about 20% by weight of the gellan gum product.

In some embodiments where the method includes drying the co-precipitated composition, the method may also include de-liquefying the co-precipitated composition prior to drying.

In some embodiments, the method also includes milling the co-precipitated composition subsequent to the step of drying. Non-limiting examples of milling the co-precipitated composition include the use of ball mills, jet mills, jar mills, hammer mills, cutting mills and disc mills.

In some embodiments, the gellan gum product has a particle size distribution in which about 95% to about 100% of the solid particles present in the gellan gum product, by volume, pass through a mesh screen of about 20 to about 325. In one embodiment, the gellan gum product has a particle size distribution in which about 95% to about 100% of the solid particles present in the gellan gum product, by volume, pass through a 28 mesh screen. In another embodiment, the gellan gum product has a particle size distribution in which about 95% to about 100% of the solid particles present in the gellan gum product, by volume, pass through a 42 mesh screen. In other embodiments, 95% to about 100% of the solid particle present in the gellan gum product, by volume, pass through a mesh screen of 20, or 24, or 28, or 32, or 35, or 42, or 48, or 60, or 65, or 80, or 100, or 115, or 150, or 170, or 200, or 250 or, 270, or 325.

In a particular embodiment, the method of preparing a gellan gum product having an improved bulk density comprises co-precipitating an aqueous gellan gum solution with a co-precipitation agent comprising a biopolymer to form a co-precipitated composition, wherein the step of co-precipitating includes treating the aqueous gellan gum solution with one or more enzymes, one or more surfactants, or a combination of the one or more enzymes and the one or more surfactants, combining the co-precipitation agent with the aqueous gellan gum solution to form a mixture, pasteurizing the mixture, and precipitating the mixture to form the co-precipitated composition; de-liquefying the co-precipitated composition; drying the co-precipitated composition; and milling the co-precipitated composition to form the gellan gum product, wherein the gellan gum product, after drying and milling, has a bulk density greater than a bulk density of the aqueous gellan gum solution precipitated, dried, and milled without the co-precipitation agent.

In another particular embodiment, the method of preparing a gellan gum product having a bulk density comprises co-precipitating an aqueous gellan gum solution with a co-precipitation agent comprising a biopolymer to form a co-precipitated composition, wherein the step of co-precipitating includes combining the co-precipitation agent with the aqueous gellan gum solution to form a mixture, treating the mixture with one or more enzymes, one or more surfactants, or a combination of the one or more enzymes and the one or more surfactants, pasteurizing the mixture, and precipitating the mixture to form the co-precipitated composition; de-liquefying the co-precipitated composition; drying the co-precipitated composition; and milling the co-precipitated composition to form the gellan gum product, wherein the gellan gum product, after drying and milling, has a bulk density greater than a bulk density of the aqueous gellan gum solution precipitated, dried, and milled without the co-precipitation agent.

The gellan gum products and methods may be further understood with the following non-limiting examples.

Example 1: Preparation of a HA Gellan Gum Product with Increased Bulk Density Using Starch A suspension of a co-precipitation agent comprising starch (AMIOCA™ starch (Ingredion, West Chester, Ill.)) was prepared in distilled water at the concentration of 20.0% (w/w) at room temperature. After which, 5.0 g of the suspension was added to a hot cup of 400.0 g of fermentation broth (enzyme-treated HA gellan gum fermentation broth) and mechanically mixed by stirring at ambient temperature until uniform. Subsequently, the mixture of starch suspension and broth was pasteurized at about 95° C. for 5 minutes. The heated mixture was then transferred into a blender containing 1000 mL of an alcohol-water mixture of 85.0% (by vol.) IPA and 15.0% tap water and mixed for about 10 to about 15 seconds at approximately 1800 rpm to precipitate a co-precipitation composition. The co-precipitated composition was then collected on a fine-mesh screen, pressed, dried, and then milled to yield a through 40-mesh gellan gum product.

Example 2: Preparation of a HA Gellan Gum Product with Increased Bulk Density Using Dextrin A suspension of a co-precipitation agent comprising dextrin (PenCling® 720B dextrin (Penford Food Ingredients, Centennial, Colo.)) was prepared in distilled water at the concentration of 33.0% (w/w) at room temperature. After which, 2.6 g of the suspension was added to a hot cup of 400.0 g of fermentation broth (enzyme-treated HA gellan gum fermentation broth) and mechanically mixed by stirring at ambient temperature until uniform. Subsequently, the mixture was pasteurized at about 95° C. for 5 minutes. The heated mixture was then transferred into a blender containing 1000 mL of an alcohol-water mixture of 85.0% (by vol.) IPA and 15.0% tap water and mixed for about 10 to about 15 seconds at approximately 1800 rpm to precipitate a co-precipitation composition. The co-precipitated composition was then collected on a fine-mesh screen, pressed, dried, and then milled to yield a through 40-mesh gellan gum product.

Example 3: Preparation of a LA Gellan Gum Product Including a Co-Precipitation Step A fermentation broth (enzyme-treated HA gellan gum fermentation broth) was first treated with alkali to covert HA gellan gum into LA gellan gum. A suspension of a co-precipitation agent comprising dextrin was prepared in distilled water at the concentration of 33.0% (w/w) at room temperature. After which, 1.8 g of the dextrin suspension was added to a hot cup of 400.0 g of the alkaline treated fermentation broth and mechanically mixed by stirring at ambient temperature until uniform. Subsequently, the mixture was pasteurized at about 95° C. for 5 minutes. The heated mixture was then transferred into a blender containing 1000 mL of an alcohol-water mixture of 85.0% (by vol.) IPA and 15.0% tap water and mixed for about 10 to about 15 seconds at approximately 1800 rpm to precipitate a co-precipitation composition. The co-precipitated composition was then collected on a fine-mesh screen, pressed, dried, and then milled to yield a through 40-mesh gellan gum product.

Example 4: Comparative Bulk Densities of HA Gellan Gum Products

Three sets of gellan gum products were prepared in which each gellan gum product of each set was prepared in a manner similar to Example 1, except that the first and third sets included different co-precipitation agents, and each set included gellan gum products with the same and different weight ratios of co-precipitation agent suspension to broth as in Example 1. The co-precipitation agents added to the fermentation broth for the three sets of gellan gum were HYLON® VII starch (Ingredion, West Chester, Ill.), AMIOCA™ starch (Ingredion, West Chester, Ill.), and MELOJEL® starch (Ingredion, West Chester, Ill.), respectively. Two sets of gellan gum products were prepared in which each gellan gum product was prepared in a manner similar to Example 2, except that the first set included a different co-precipitation agent, and each set included gellan gum products with different weight ratios of co-precipitation agent suspension to fermentation broth as in Example 2. The co-precipitation agent added to the fermentation broth for the two sets of gellan gum were MALTRIN® M040 maltodextrin (Grain Processing Corporation, Muscatine, Iowa) and PenCling® 720B dextrin (Penford Food Ingredients, Centennial, Colo.), respectively.

The bulk density of each gellan gum product sample of these five sets of gellan gum products were measured using the bulk density method as described herein. The bulk density measurements of each gellan gum product sample are summarized in Table 1.

TABLE 1

Bulk Density Measurements of Gellan Gum Products with Different Co-precipitation Agents of Varying Amounts.

| Set | Co-Precipitation Agent | Weight Ratio of Agent Solution:Fermentation Broth | Bulk Density (g/mL) |
|---|---|---|---|
| 1 | HYLON ® VII starch | (Control)* | 0.38 |
|  | Chemical Name: Native Starch, 70% Amylose, | 1:10 | 0.54 |
|  | 30% Amylopectin | 3:40 | 0.55 |
|  | Manufacturer: Ingredion (National Starch) | 1:40 | 0.47 |
|  |  | 1:80 | 0.44 |

TABLE 1-continued

Bulk Density Measurements of Gellan Gum Products with Different Co-precipitation Agents of Varying Amounts.

| Set | Co-Precipitation Agent | Weight Ratio of Agent Solution:Fermentation Broth | Bulk Density (g/mL) |
|---|---|---|---|
| 2 | AMIOCA ™ starch | (Control)* | 0.38 |
|   | Chemical Name: Native Starch, 99% Amylopectin | 3:40 | 0.82 |
|   | Manufacturer: Ingredion (National Starch) | 1:20 | 0.76 |
|   |  | 1:40 | 0.60 |
|   |  | 1:80 | 0.56 |
| 3 | MELOJEL ® starch | (Control)* | 0.32 |
|   | Chemical Name: Native Starch, 25% Amylose, | 3:40 | 0.76 |
|   | 75% Amylopectin | 1:20 | 0.52 |
|   | Manufacturer: Ingredion (National Starch) | 1:40 | 0.41 |
|   |  | 1:80 | 0.35 |
| 4 | MALTRIN ® M040 maltodextrin | (Control)* | 0.28 |
|   | Chemical Name: Maltodextrin, ~5DE | 1:10 | 0.73 |
|   | Manufacturer: Grain Processing Corporation | 3:40 | 0.68 |
|   |  | 1:20 | 0.61 |
|   |  | 1:40 | 0.52 |
|   |  | 1:80 | 0.43 |
| 5 | PenCling ® 720B dextrin | (Control)* | 0.30 |
|   | Chemical Name: Potato Dextrin, ~2DE | 1:20 | 0.68 |
|   | Manufacturer: Penford Food Ingredients | 1:40 | 0.62 |
|   |  | 1:80 | 0.41 |

*Control: does not include a co-precipitation agent.

As illustrated in Table 1, the general trend was the more co-precipitation agent added to the fermentation broth, the greater the bulk density. Without any co-precipitation agent, the bulk density of the gellan gum product averaged 0.33 g/mL. Based on this, at any addition ratio of co-precipitation agent to fermentation broth, all the co-precipitation agents were able to increase the bulk density to varying degrees. For example, at the lowest ratio (1:80), AMIOCA™ starch provided the highest bulk density, 0.56 g/mL, which is about a 70.0% increase over the control. In principle, lower AMIOCA™ starch usage may also significantly increase the bulk density of gellan.

Example 5: Bulk Densities of Co-Precipitated LA Gellan Gum Products

A set of gellan gum products were prepared which included a gellan gum product prepared exactly as in Example 3 and an additional gellan gum product prepared similar to Example 3, except with a different weight ratio of co-precipitation agent suspension to broth. The co-precipitation agent added to the fermentation broth for the set of gellan gum was PenCling® 720B dextrin.

The bulk density of each gellan gum product sample of the set of gellan gum products was measured using the bulk density method as described herein. The bulk density measurements of each gellan gum product sample are summarized in Table 2.

TABLE 2

Bulk Density Measurements of Gellan Gum Products with Co-precipitation Agent of Varying Amounts.

| Co-Precipitation Agent | Weight Ratio of Agent Solution:Fermentation Broth | Bulk Density (g/mL) |
|---|---|---|
| PenCling ® 720B dextrin | (Control)* | 0.32 |
| Chemical Name: Potato Dextrin, ~2DE | 1:444 | 0.41 |
| Manufacturer: Penford Food Ingredients | 1:222 | 0.51 |

*Control: does not include a co-precipitation agent.

As illustrated in Table 2 the more co-precipitation agent added to the fermentation broth, the greater the bulk density, which is similar to the general trend shown in Example 4. Without any co-precipitation agent, the bulk density of the gellan gum product averaged 0.32 g/mL. Thus, similar to Example 4, the addition of co-precipitation agent to fermentation broth at any ratio results in an increase of the bulk density.

Further, the degree of increase in bulk density is also dosage dependent. As shown in Table 2, at a weight ratio of 1:444, the bulk density increased to 0.41 g/mL, which is about a 28.0% increase over the control, whereas at a weight ratio of 1:222, the bulk density increased to 0.51, which is about a 59.0% increase over the control.

Example 6: Comparative Bulk Densities of Co-Precipitated Gellan Gum Products vs. Dry Blended Gellan Gum Products Two co-precipitated gellan gum product samples were prepared. The first co-precipitated sample was prepared by adding 0.84 g of AMIOCA™ starch powder to a hot cup of 400.0 g of fermentation broth (enzyme-treated HA gellan gum fermentation broth) and mechanically mixed by stirring at ambient temperature until uniform. The mixture was then pasteurized at about 95° C. for 5 minutes and then transferred into a blender containing 1000 mL of an alcohol-water mixture of 85.0% (by vol.) IPA and 15.0% tap water and mixed for about 10 to about 15 seconds at approximately 1800 rpm to precipitate out the co-precipitation composition. The co-precipitated composition was then collected on a fine-mesh screen, pressed, dried, and then milled to yield the first co-precipitated gellan gum product. The second co-precipitated gellan gum product sample was similarly prepared as the first-precipitated sample except that 0.84 g of PenCling® 720B dextrin was added to 400.0 g of broth.

Two dry blended gellan gum product samples were also prepared. The first dry blended gum product was prepared by adding 2.0 g of AMIOCA™ starch powder to 16.0 g of gellan gum powder and manually mixed to yield the first dry blended gum product. The second dry blended gellan gum product sample was similarly prepared except that 2.0 g of PenCling® 720B dextrin powder was added to 16.0 g of gellan gum.

The bulk density of each gellan gum product sample was measured using the bulk density method as described herein. The bulk density measurement of each gellan gum product sample is summarized in Table 3.

TABLE 3

Bulk Density Measurements of Co-Precipitated Gellan Gum Products and Dry Blended Gellan Gum Products

| Co-Precipitation Agent | Control Bulk Density (g/ml) (Mean ± Std Dev, n = 3) | Co-Precipitated Bulk Density (g/mL) (Mean ± Std Dev, n = 3) | Dry Blended Bulk Density (g/mL) |
|---|---|---|---|
| AMIOCA™ starch Chemical Name: Native Starch, 99% Amylopectin Manufacturer: Ingredion (National Starch) | 0.33 ± 0.03 | 0.46 ± 0.03 | 0.37 |
| PenCling ® 720B dextrin Chemical Name: Potato Dextrin, ~2DE Manufacturer: Penford Food Ingredients | 0.33 ± 0.03 | 0.52 ± 0.07 | 0.38 |

As illustrated in Table 3, without co-precipitation or dry blending, the bulk density of the gellan gum product averaged 0.33 g/mL. After dry blending with AMIOCA™ starch, the bulk density of the dry blended gellan gum product increased to 0.37 g/mL, a 12.0% improvement from the control. After dry blending with PenCling® 720B dextrin, the bulk density of the dry blended gellan gum product increased to 0.38 g/mL, a 15.0% improvement from the control. In contrast, after co-precipitating with AMIOCA™ starch, the bulk density of the co-precipitated gellan gum product increased to 0.46 g/mL, and the bulk density of the co-precipitated gellan gum product co-precipitated with of PenCling® 720B dextrin increased to 0.52 g/mL, thereby representing an improvement of 39.0% and 58.0%, respectively, from the control.

These results demonstrate not only the effect co-precipitation has on increasing the bulk density of gellan gum products, but also that higher bulk densities can be obtained through co-precipitation over that of dry blending.

Modifications and variations of the methods and products described herein will be obvious to those skilled in the art from the foregoing detailed description. Such modification and variations are intended to come within the scope of the appended claims.

We claim:

1. A method of preparing a gellan gum product, comprising:
    co-precipitating an aqueous gellan gum solution with a co-precipitation agent comprising a native starch to form a co-precipitated composition,
    drying the co-precipitated composition,
    milling the co-precipitated composition,
    wherein the gellan gum product, after drying and milling, has a bulk density greater than a bulk density of the aqueous gellan gum solution precipitated, dried, and milled without the co-precipitation agent, and
    wherein the gellan gum is present in the co-precipitated composition at an amount that is equal to or greater than an amount of the co-precipitation agent by weight.

2. The method of claim 1, further comprising de-liquefying the co-precipitated composition.

3. The method of claim 2, wherein the step of de-liquefying comprises pressing the co-precipitated composition, centrifuging the co-precipitated composition, or a combination of pressing and centrifuging the co-precipitated composition.

4. The method of claim 1, wherein the step of co-precipitating comprises
    combining the co-precipitation agent with the gellan gum solution to form a mixture; and
    precipitating the mixture to form the co-precipitated composition.

5. The method of claim 1, wherein the step of co-precipitating comprises precipitating a mixture of the aqueous gellan gum solution and the co-precipitation agent to form the co-precipitated composition by adding an effective amount of an anti-solvent to the mixture.

6. The method of claim 5, wherein the anti-solvent comprises one or more alcohols.

7. The method of claim 5, wherein the anti-solvent is an alcohol-water mixture that comprises an alcohol in an amount from about 80.0% to about 99.0% based on volume of the alcohol-water mixture.

8. The method of claim 1, further comprising treating the aqueous gellan gum solution with one or more enzymes, one or more surfactants, or a combination of the one or more enzymes and the one or more surfactants.

9. The method of claim 1, wherein the step of co-precipitating comprises
    treating a mixture of the aqueous gellan gum solution and the co-precipitation agent with one or more enzymes, one or more surfactants, or a combination of the one or more enzymes and the one or more surfactants; and
    precipitating the mixture to form the co-precipitated composition.

10. The method of claim 4, wherein the step of co-precipitating further comprises pasteurizing the mixture.

11. The method of claim 1, wherein the step of co-precipitating comprises
    treating the aqueous gellan gum solution with one or more enzymes, one or more surfactants, or a combination of the one or more enzymes and the one or more surfactants;
    combining the co-precipitation agent with the aqueous gellan gum solution to form a mixture;
    pasteurizing the mixture; and
    precipitating the mixture to form the co-precipitated composition.

12. The method of claim 1, wherein the step of co-precipitating comprises
    combining the co-precipitation agent with the aqueous gellan gum solution to form a mixture;
    treating the mixture with one or more enzymes, one or more surfactants, or a combination of the one or more enzymes and the one or more surfactants;
    pasteurizing the mixture; and
    precipitating the mixture to form the co-precipitated composition.

13. The method of claim 1, wherein the gellan gum is a high-acyl gellan gum, low acyl gellan gum, or mixture thereof.

14. The method of claim 1, wherein the gellan gum product bulk density is about 0.30 g/mL or greater.

15. The method of claim 1, wherein the gellan gum product bulk density is about 0.30 g/mL to about 1.00 g/mL.

16. The method of claim 1, wherein the gellan gum product bulk density is about 0.40 g/mL to about 0.85 g/mL.

17. A gellan gum product comprising:
   a co-precipitated composition comprising a gellan gum co-precipitated with a co-precipitation agent comprising a native starch,
   wherein the co-precipitation agent and the gellan gum are present in the co-precipitated composition in a weight ratio effective to produce the gellan gum product, wherein the gellan gum is present in the co-precipitated composition at an amount that is equal to or greater than an amount of the co-precipitation agent by weight, and
   wherein the gellan gum product, after drying and milling, has a bulk density greater than a bulk density of the gellan gum precipitated, dried, and milled without the co-precipitation agent.

18. The gellan gum product of claim 17, wherein the gellan gum is a high-acyl gellan gum, low acyl gellan gum, or a combination thereof.

19. The gellan gum product of claim 17, wherein the gellan gum product bulk density is about 0.30 g/mL or greater.

20. A method of preparing a gellan gum product, comprising:
   co-precipitating an aqueous gellan gum solution with a co-precipitation agent comprising a native starch to form a co-precipitated composition,
   drying the co-precipitated composition,
   milling the co-precipitated composition,
   wherein the gellan gum product, after drying and milling, has a bulk density of about 0.30 g/mL or greater, and
   wherein the gellan gum is present in the co-precipitated composition at an amount that is equal to or greater than an amount of the co-precipitation agent by weight.

21. The gellan gum product of claim 17, wherein the weight ratio of co-precipitation agent to gellan gum is about 1:100 to about 1:1.

22. The gellan gum product of claim 21, wherein the weight ratio of co-precipitation agent to gellan gum is from about 1:20 to about 1:2.

23. The method of claim 1, wherein the weight ratio of co-precipitation agent to gellan gum is about 1:100 to about 1:1.

24. The method of claim 23, wherein the weight ratio of co-precipitation agent to gellan gum is from about 1:20 to about 1:2.

25. The method of claim 1, wherein the gellan gum product comprises water in an amount of from about 0.01% to about 10% by weight.

26. The gellan gum product of claim 17, wherein the gellan gum product comprises water in an amount of from about 0.01% to about 10% by weight.

27. The method of claim 1, wherein the gellan gum product, after drying and milling, has a bulk density greater than a bulk density of a comparative composition comprising a dry blend of the co-precipitation agent and the aqueous gellan gum solution precipitated, dried, and milled without the co-precipitation agent, and
   wherein the gellan gum and the co-precipitation agent are present in the comparative composition at the same amounts as in the co-precipitated composition.

28. The gellan gum product of claim 17, wherein the gellan gum product, after drying and milling, has a bulk density greater than a bulk density of a comparative composition comprising a dry blend of the co-precipitation agent and the aqueous gellan gum solution precipitated, dried, and milled without the co-precipitation agent, and
   wherein the gellan gum and the co-precipitation agent are present in the comparative composition at the same amounts as in the co-precipitated composition.

* * * * *